(12) United States Patent
Andersson et al.

(10) Patent No.: US 8,708,408 B2
(45) Date of Patent: Apr. 29, 2014

(54) ARMREST ASSEMBLY HAVING BEVERAGE HOLDER

(75) Inventors: Christer Andersson, Trollhattan (SE); Adam Alfredsson, Vanersborg (SE)

(73) Assignee: Lear Corporation, Southfield, MI (US)

( * ) Notice: Subject to any disclaimer, the term of this patent is extended or adjusted under 35 U.S.C. 154(b) by 281 days.

(21) Appl. No.: 13/251,523

(22) Filed: Oct. 3, 2011

(65) Prior Publication Data

US 2013/0082492 A1    Apr. 4, 2013

(51) Int. Cl.
A47C 7/62    (2006.01)
(52) U.S. Cl.
USPC ............ 297/188.17; 297/188.04; 297/188.14; 297/188.15; 297/188.16
(58) Field of Classification Search
USPC ............ 297/188.04, 188.07, 188.14, 188.15, 297/188.16, 188.17
See application file for complete search history.

(56) References Cited

U.S. PATENT DOCUMENTS

| | | | |
|---|---|---|---|
| 5,171,061 A | | 12/1992 | Marcusen |
| 5,267,761 A | | 12/1993 | Curtindale et al. |
| 5,284,314 A | * | 2/1994 | Misaras et al. ............. 248/311.2 |
| 5,379,978 A | * | 1/1995 | Patel et al. ................. 248/311.2 |
| 5,505,516 A | | 4/1996 | Spykerman et al. |
| 5,524,958 A | | 6/1996 | Wieczorek et al. |
| 5,634,621 A | | 6/1997 | Jankovic |
| 5,639,002 A | | 6/1997 | Weitbrecht et al. |
| 5,692,718 A | * | 12/1997 | Bieck .......................... 248/311.2 |
| 5,779,302 A | * | 7/1998 | Geier et al. ............... 297/188.17 |
| 5,899,426 A | * | 5/1999 | Gross et al. ................ 248/311.2 |
| 6,019,334 A | | 2/2000 | Shinomiya |
| 6,409,136 B1 | | 6/2002 | Weiss et al. |
| 6,439,525 B1 | * | 8/2002 | Gehring et al. ............ 248/311.2 |
| 6,644,526 B2 | | 11/2003 | Pegorier |
| 6,692,053 B1 | | 2/2004 | Smith |
| 6,708,938 B2 | | 3/2004 | Bong |

(Continued)

FOREIGN PATENT DOCUMENTS

| | | |
|---|---|---|
| DE | 4200823 A1 | 7/1993 |
| DE | 4306935 C1 | 7/1994 |

(Continued)

OTHER PUBLICATIONS

International Search Report, Application No. PCT/US2011/027022 dated Nov. 15, 2011.

(Continued)

*Primary Examiner* — Philip Gabler
(74) *Attorney, Agent, or Firm* — MacMillan, Sobanski & Todd, LLC (57) ABSTRACT

A cupholder assembly has a housing with an opening and first and second support members movably mounted on the housing. The first support member moves along a first direction between a retracted position and an extended position. The second moves along a second direction that is normal to the first direction between a first position and a second position that is further spaced from a distal portion of the first support member. The distal portion of the second support member includes a support surface adapted to provide support for an item when the distal portion of the second support member is in the second position. A support rod has a first end connected to the first support member and a second end connected to the second support member. The support rod is angled relative to a third direction normal to the first and second directions when the distal portion of the second support member is in the second position.

20 Claims, 5 Drawing Sheets

(56) References Cited

U.S. PATENT DOCUMENTS

| | | |
|---|---|---|
| 6,764,053 B1 | 7/2004 | Han |
| 6,776,381 B1 | 8/2004 | Gisch |
| 6,779,769 B1 * | 8/2004 | York et al. ............... 248/311.2 |
| 6,837,471 B2 * | 1/2005 | Izume ..................... 248/311.2 |
| 6,969,035 B2 | 11/2005 | Leopold et al. |
| 6,997,509 B2 | 2/2006 | Kain |
| 7,025,316 B2 | 4/2006 | Schaal |
| 7,104,580 B2 | 9/2006 | Clark et al. |
| 7,131,690 B2 * | 11/2006 | Bollaender et al. ...... 297/188.17 |
| 7,225,957 B2 * | 6/2007 | Kogami ..................... 224/483 |
| 7,578,406 B2 | 8/2009 | Katagiri |
| 2006/0076820 A1 * | 4/2006 | Lackore ................ 297/452.29 |
| 2007/0013202 A1 | 1/2007 | Tompson |
| 2009/0095764 A1 | 4/2009 | Schaal |

FOREIGN PATENT DOCUMENTS

| | | |
|---|---|---|
| DE | 9306415 U1 | 9/1994 |
| DE | 4415732 A1 | 11/1995 |
| DE | 29810872 U1 | 8/1998 |
| DE | 10149616 A1 | 4/2003 |
| DE | 10215152 A1 | 10/2003 |
| DE | 202005003638 U1 | 5/2005 |
| DE | 202005003650 U1 | 5/2005 |
| DE | 102006003320 A1 | 8/2007 |
| DE | 102008033326 A1 | 12/2009 |
| EP | 1655169 A2 | 5/2006 |
| EP | 2172134 A1 | 4/2010 |
| JP | 6191339 A | 7/1994 |
| JP | 6336136 A | 12/1994 |
| JP | 2003245162 | 2/2003 |
| JP | 2007290458 A | 11/2007 |
| KR | 100559704 B1 | 3/2006 |

OTHER PUBLICATIONS

German Search Report, Application No. 102011083457.5, dated Oct. 16, 2012.

* cited by examiner

ARMREST ASSEMBLY HAVING BEVERAGE HOLDER

BACKGROUND OF THE INVENTION

This invention relates in general to vehicle interior components and in particular to armrests having beverage containers mounted therein.

It is becoming common for various components of a vehicle interior to include beverage or cupholders for securing various items, such as a beverage container. It is known to integrate cupholders into portions of vehicle seats. For example, a cupholder may be incorporated into an armrest assembly of a rear bench style seat, wherein the armrest assembly is movable between a raised and a lowered position. Such conventional cupholders utilize a plastic base which is mounted or insert molded into the foam portion of the armrest.

SUMMARY OF THE INVENTION

This invention relates to beverage holders or cupholders, such as for example, those mounted in an armrest of a vehicle seat. The cupholder assembly supports a beverage or item placed thereon. The assembly includes a housing having an opening. A first support member is slidably mounted on the housing and is movable along a first direction between a retracted position, wherein a distal portion of the first support member is disposed in the opening, and an extended position, wherein the distal portion of the first support member extends outwardly from the opening. The distal portion includes a support surface adapted to support an item. A second support member is movably mounted on the first support member such that a distal portion of the second support member is movable in a second direction that is normal to the first direction between a first position and a second position that is further spaced from the distal portion of the first support member. The distal portion of the second support member includes a support surface adapted to provide support for the item when the distal portion of the second support member is in the second position. A support rod has a first end connected to the first support member and a second end connected to the second support member. The support rod is angled relative to a third direction which is normal to the first and second directions when the distal portion of the second support member is in the second position.

Various aspects of this invention will become apparent to those skilled in the art from the following detailed description of the preferred embodiments, when read in light of the accompanying drawings.

DETAILED DESCRIPTION OF THE EMBODIMENTS

Figure 1:
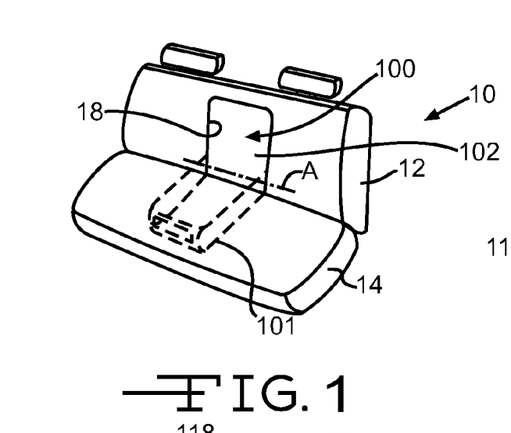
FIG. 1 is a schematic perspective view of a bench style seat having an armrest assembly mounted therein.

Referring now to the drawings, there is illustrated in FIG. 1 vehicle seat assembly 10. The seat assembly 10 may be in the form of a bench style seat such as for use as a rear seat of a sedan type vehicle. The seat assembly 10 includes a seat back 12 and a seat bottom 14. The seat back 12 may be fixed relative to the seat bottom 14 or may be pivotally mounted with respect to the seat bottom 14. The seat assembly 10 further includes an armrest assembly, indicated generally at 100. The armrest assembly 100 is movable between a storage upright position located within a recess 18 of the seat assembly 10, as shown in solid lines 100 in FIG. 1. The armrest assembly 100 is pivotally mounted relative to the seat back 12 such that the armrest assembly 100 pivots about an axis A, and can be moved to a lowered or use position as indicated by the broken lines 101. The armrest assembly 100 may be mounted in the recess 18 such that a surface 102 of the armrest assembly 100 defines a seating surface (against an occupant's back) for the seat back 12 of the seat assembly 10. When in the lowered or use position, the armrest assembly 100 may be used as an armrest for passengers sitting on either side of the armrest assembly 100.

As will be discussed in detail below, the armrest assembly 100 generally includes a body 108, a beverage or cupholder assembly 110, and a framework assembly 112. The framework assembly 112 may include structures positioned at the perimeter of the armrest assembly 100 to provide support and rigidity to the armrest assembly 100. The body 108 may cover the framework assembly 112 as well as portions of the cupholder assembly 110. The body 108 may be formed from a foam material or other padding material. The body 108 may also be covered with an upholstery cover material for a more pleasant aesthetic appearance. In one example, the cupholder assembly 110 and the framework assembly 112 may be insert molded into a foam material forming the body 108.

Figure 2:
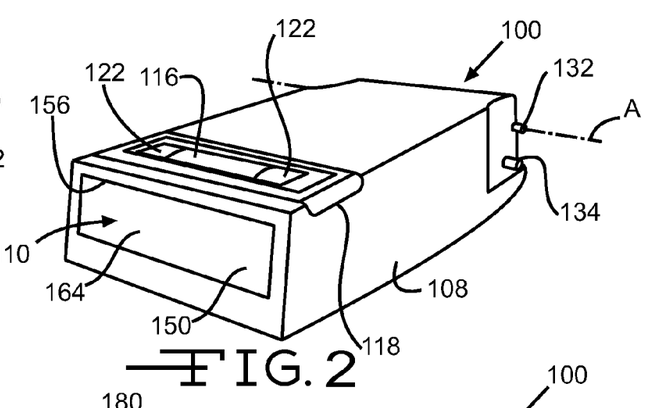
FIG. 2 is a perspective view of the armrest assembly of FIG. 1 having a cupholder assembly, wherein the cupholder assembly is shown in its retracted storage position.
Figure 3:
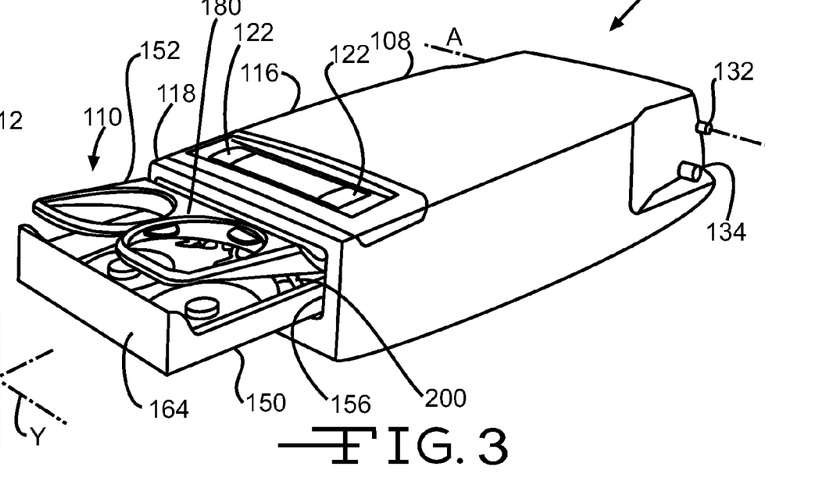
FIG. 3 is a perspective view of the armrest assembly of FIG. 2, wherein the cupholder assembly is shown in its extended use position.
Figure 6:
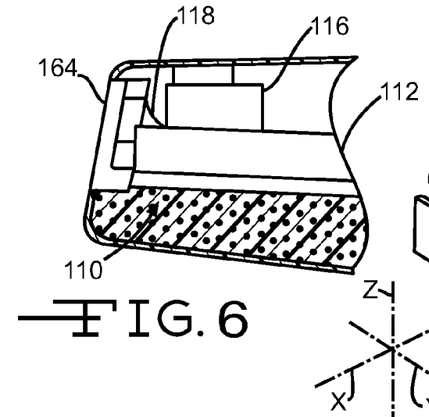
FIG. 6 is a partial side elevational view of the armrest assembly of FIG. 2, wherein the outline of the foam padding is shown by broken lines to illustrate the positional relationship between the cupholder assembly and the audio control unit.

As shown in FIGS. 2 and 3, the armrest assembly 100 may further include an audio/video control module, indicated generally at 116. The control module 116 is mounted at an upper front portion 118 of the body 108 of the armrest assembly 100. This location provides for convenient access to passengers sitting on the either side of the armrest assembly 100 when it is moved to its lowered use position. As will be discussed below, the configuration and deployment of the cupholder assembly 110 provides the necessary space for the mounting location of the control module 116 within the armrest assembly 100. As shown in FIG. 6, the control module 116 is located immediately above a front portion 118 of the cupholder assembly 110 and behind a front wall 164 of the cupholder assembly 110. The control module 116 may include any suitable controls 122, such as switches, buttons, displays, or other components for controlling an audio, video, gaming or other entertainment device (not shown) mounted within the vehicle interior. Alternatively, the control module 116 may be used for controlling other vehicle components and features such as an HVAC system, door locks, and window locks. As another alternative, the upper front corner 118 may instead house a storage compartment located therein. The storage compartment could be used to store any number of items, such as headphones and wireless controllers.

Figure 4:
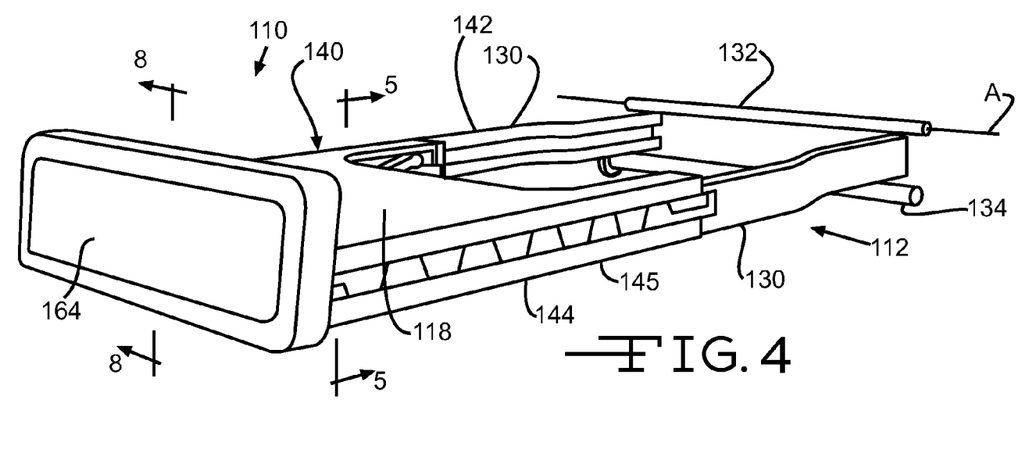
FIG. 4 is a perspective view of the cupholder assembly and frame assembly of the armrest assembly of FIG. 2.
Figure 5:
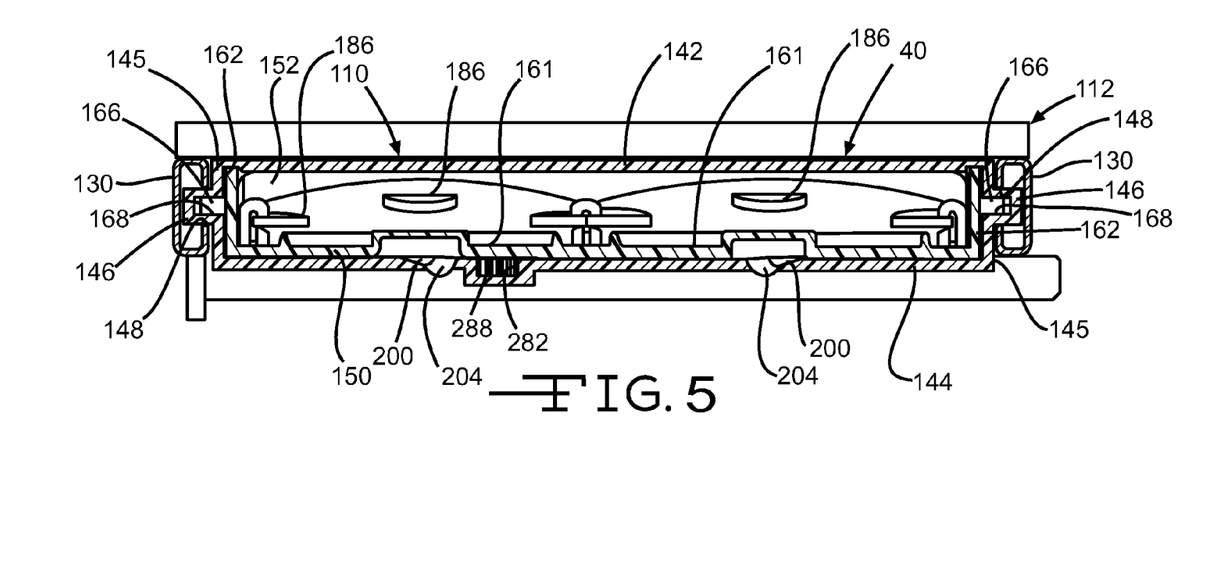
FIG. 5 is a partial sectional view of the cupholder assembly and frame assembly taken along lines 5-5 of FIG. 4.

Referring to FIGS. 4 and 5, the framework assembly 112 includes a pair of elongated side members 130. In the illustrated embodiment, the side members 130 extend generally along the entire sides of the armrest assembly 100. The illustrated side members 130 have a generally C-shaped cross-sectional shape and may be formed from a relatively rigid material, such as metal. The framework assembly 112 further includes a pair of rear cross members 132 and 134. The cross member 132 may used to provide a pivoting mounting arrangement with the seat back 12 along the axis A. The ends of the cross member 132 may be inserted into apertures of a seat back frame (not shown) to provide for such a pivoting mounting arrangement. The other cross member 134 may be used as a guide and stop for maintaining the armrest assembly 100 in its lowered use position. For example, the ends of the cross member 134 may be inserted into an arcuate slot or track formed in the seat back frame (not shown) such that movement of the armrest assembly 100 is prevented when the ends of the cross member 134 abut against ends of the arcuate slot.

The cupholder assembly 110 includes a housing, indicated generally at 140, which is fixedly mounted within the body 108 of the armrest assembly 100. The housing 140 may be insert molded within the body 108 or may be simply disposed in a recess formed therein. In the illustrated embodiment, the housing 140 is a two-piece part having an upper portion 142 and a lower portion 144 which are connected together at side portions 145 thereof such as by a dovetail type of mating configuration as shown in FIG. 4. Of course, the upper and lower portions 142 and 144 may be connected together by any suitable method or, alternatively, have any number of parts or made from a single part. The housing 140 includes an elongated extension 146 extending along and protruding from each side portion 145 of the housing 140. As best shown in FIG. 5, the extensions 146 are disposed in slots 148 formed in the side members 130 of the framework assembly 112, thereby attaching the cupholder assembly 110 to the framework assembly 112.

The cupholder assembly 110 further includes a lower support member 150 and an upper support member 152 pivotally connected to the lower support member 150. As will be described in detail below, the lower and upper support members 150 and 152 are movable between a retracted storage position, as shown in FIG. 2, to an extended use position positioned outwardly from an opening 156 of the body 108, as shown in FIG. 3. During movement toward the extended use position, the upper support member 152 rises vertically relative to the lower support member 150. In the extended use position, the lower and upper support members 150 and 152 are able to support beverages or other items placed thereon.

For reference, there is illustrated FIG. 3 a three dimensional axis indicating the general directions for a longitudinal direction X, a lateral direction Y, and a vertical direction Z. Such terminology will be used for the purpose of reference only, and are not intended to be limiting.

The lower support member 150 includes a generally planar main portion 160 which functions a floor for supporting a beverage or other item placed thereon. The main portion 160 may include circular recesses 161 or other suitable contoured surfaces formed therein to further support an item, such as a cylindrical cup, resting on the circular recesses 161. The lower support member 150 further includes side walls 162 and the front wall 164. The front wall 164 may define a distal end or portion of the lower support member 150 which is disposed within the opening 156 when the cupholder assembly 110 is in its retracted position. When in the extended position, the front wall 164 extends outwardly from the opening 156. As shown in FIG. 2, the front wall 164 covers the opening 156 of the body 108 when the lower support member is in its retracted storage position. Each of the side walls 162 may include an outwardly extending flange or guide 166 extending longitudinally along a rear portion of the respective side wall 162. As best shown in FIG. 5, the guides 166 are slidably disposed in recesses or tracks 168 formed in the side portions 145 of the housing 140. During movement of the lower support member 150 between the extended and retracted positions, the guides 166 slide within the respective track 168.

The upper support member 152 includes a generally planar front portion 180 having a pair of openings 182 formed therein for receiving a beverage or other item placed therethrough. Edges of the openings 182 provide for lateral support for the beverage or other items placed though the openings 182. The front portion 180 may define a distal end or portion of the upper support member 152 which is disposed within the opening 156 when the cupholder assembly 110 is in its retracted position. When in the extended position, the front portion 180 extends outwardly from the opening 156, as well as upwardly from the lower support member 150. The openings 182 can have any suitable shape for accommodating a desired item to be placed therethrough. The upper support member 152 may include optional flexible pads 186 extending radially inwardly from the edges 184 of the openings 182 to accommodate and support items that are smaller than the openings 182. The pads 186 are preferably flexible such that they may deflect downwardly or upwardly when urged by a beverage or item placed in the openings 182. There are four pads 186 shown for each opening 182, but it should be understood that any number of pads 186 may be used or can have any suitable shape for supporting an object while maintaining its flexibility.

Figure 8:
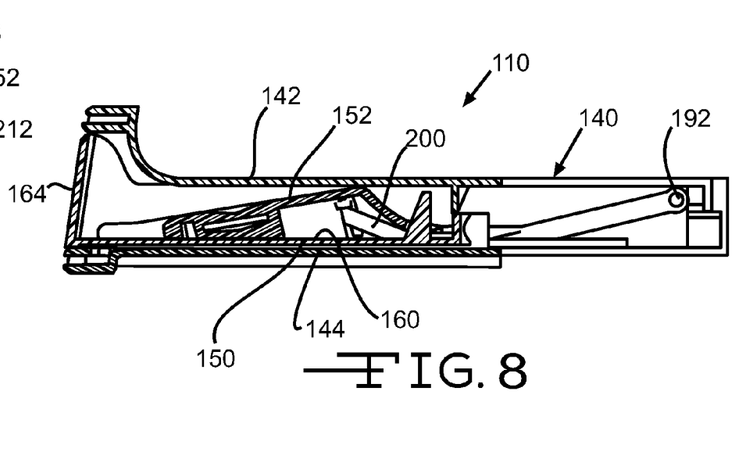
FIG. 8 is a cross-sectional view of the cupholder assembly taken along lines 8-8 of FIG. 4, wherein the cupholder assembly is shown in its retracted storage position.
Figure 9:
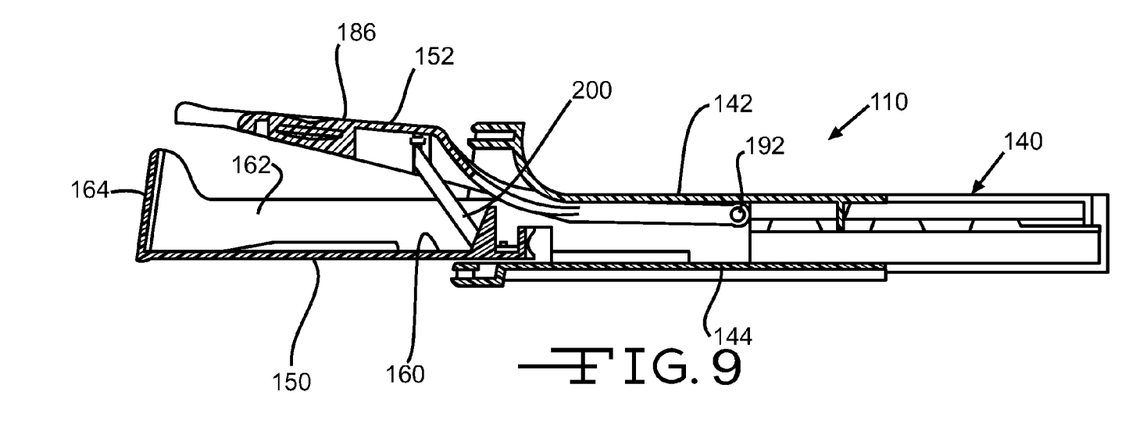
FIG. 9 is a cross-sectional view of the cupholder assembly similar to FIG. 8, wherein the cupholder assembly shown in its extended use position.

The upper support member 152 further includes a pair of rearwardly extending legs 190. The ends of the legs 190 are pivotally attached to the side walls 162 of the lower support member 150 at pivots 192. The side walls 162 and the legs 190 define proximal portions of the lower and upper support members 150 and 152, respectively, which are connected at the pivots 192. The pivots 192 may be any suitable pivot structure, such as pins rotatably disposed in holes formed in either of the lower and upper support members 150 and 152. When the upper support member 152 is in its extended position, the legs 190 are lower than the front portion 180, as shown in FIG. 9. As shown in FIGS. 8 and 9, the pivots 192 are located at upper portions of the side walls 162. This configuration of the upper support member 152 permits the upper support member 152 to be oriented in a slanted manner within the housing 140 to minimize the vertical space within the housing 140, as shown in FIG. 8, while permitting a relatively large height distance of the front portion 180 above the floor of the main portion 160 of the lower support member 150.

Figure 13:
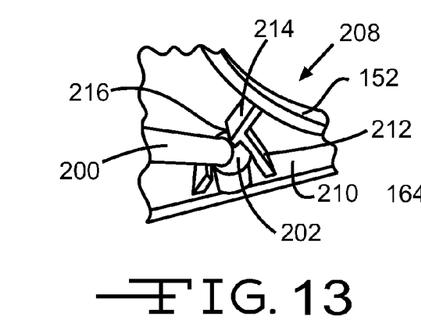
FIG. 13 is a perspective view looking upward towards a portion of the upper support member illustrating the ball joint connection between an upper end of a support rod and the upper support member.

The upper support member 152 is supported above the lower support member 150 by the pivots 192 and a pair of elongated support rods 200. Each of the support rods includes a spherical upper end 202 and a spherical lower end 204. The upper ends 202 are pivotally attached to the upper support member 152 by a ball-joint or ball and socket type of configuration such that the support rods 200 may move in both the lateral and longitudinal directions relative to the upper support member 152 as the upper support member 152 moves between its retracted and extended positions. FIG. 13 illustrates one example of a suitable mounting connection, indicated generally at 208, between the upper end 202 of the support rod 200 and the underside of the upper support member 152. The upper end 202 of the support rod 200 is essentially trapped between three walls formed in the front portion 180 of the upper support member 152: a side wall 210, a webbing 212, and a webbing 214 having a slot 216 formed therein throughwhich the support rod 200 extends. The slot 216 is of sufficient width to permit the motion of the support rod 200 when the lower and upper support members 150 and 152 move between their extended and retracted positions. The mounting connection 208 provides support for the longitudinal and lateral directions, but not in the vertical direction. Upon assembly of the cupholder assembly 110, the upper end 202 of the support rod 200 is prevented from slipping downwardly from the wall 210 and the webbings 212 and 214.

The lower ends 204 of the support rods 200 are pivotally and slidably attached to the lower support member 150 such that the support rods 200 may move in both the lateral and longitudinal directions relative to the lower support member 150 as the lower support member 150 moves between its retracted and extended positions. However, unlike the upper ends 202, the lower ends 204 of the support rods 200 are not connected to the lower support member 150 by a fixed ball and socket type of connection.

Figure 10:
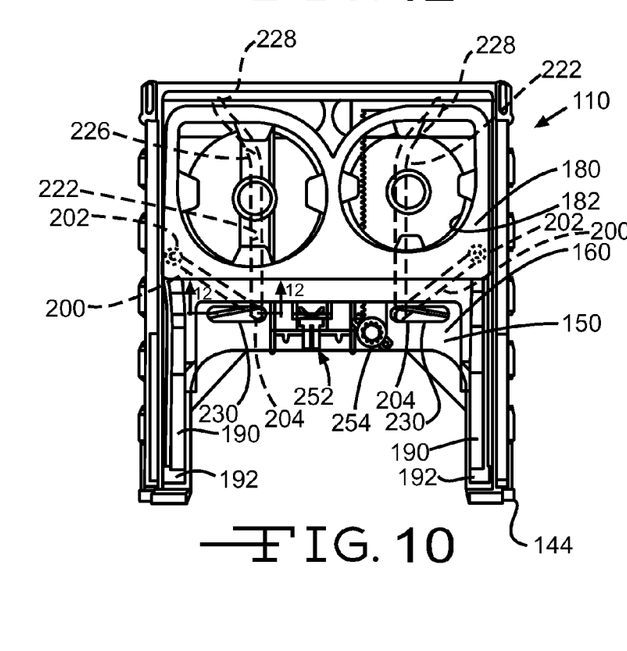
FIG. 10 is a top plan view of the cupholder assembly of FIG. 2 in its retracted storage position, wherein the upper housing is removed to illustrate various components of the cupholder assembly.
Figure 11:
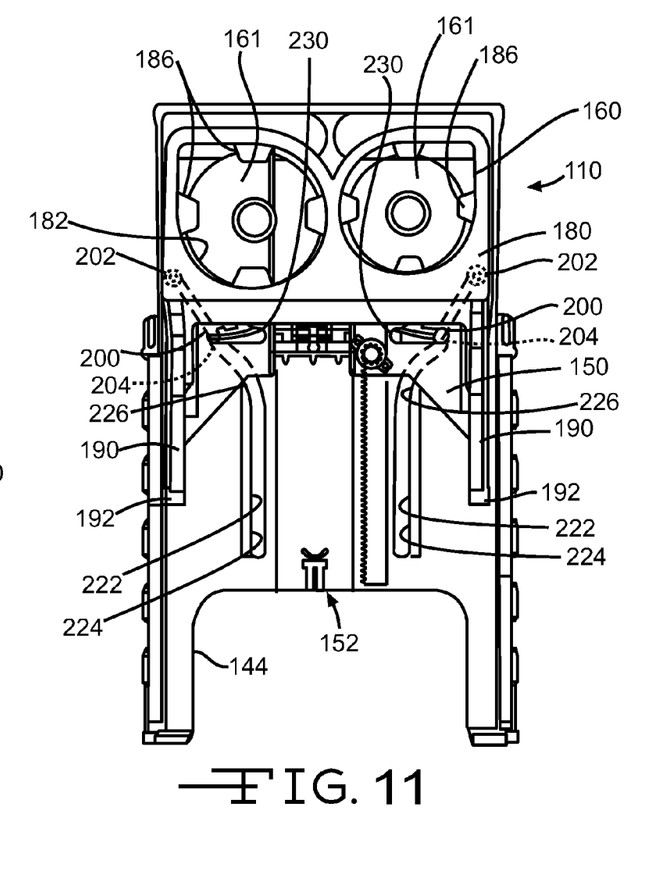
FIG. 11 is a top plan view of the cupholder assembly of FIG. 2 in its extended use position, wherein the upper housing is removed to illustrate various components of the cupholder assembly.
Figure 12:
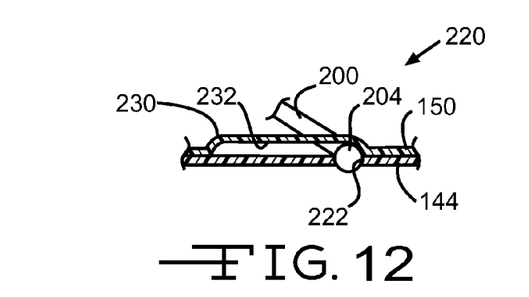
FIG. 12 is a cross-sectional view of a retaining portion of the cupholder assembly taken along lines 12-12 of FIG. 10 illustrating the connection between a lower end of a support member with the lower support member and the housing.

FIGS. 10 through 12 illustrate one example of a suitable mounting connection, indicated generally at 220, between the lower end 204 of the support rod 200 and the lower support member 150. The lower portion 144 of the housing 140 includes a pair of slots 222. Each slot 222 receives a respective lower end 204 of a support rod 200. The slots 222 generally extend along the longitudinal direction and prevent the lower ends 204 of the support rods 200 from moving in a generally lateral direction as the lower ends 204 slide along the length of the slots 222. The slots 222 include a straight portion 224, a curved portion 226, and a detent portion 228. The curved portions 226 curve outwardly from the straight portions 224 toward the sides 145 of the housing 110. The detent portions 228 define a relatively small curve portions located at front ends of the curve portions 226 which curve in the opposite direction of the curved portions 226. The very ends of the detent portions 228 are generally parallel to the straight portions 224. The slots 222 preferably have a constant dimensional width along their entire length including the straight portions 224, the curved portions 226, and the detent portions 228. As best shown in FIG. 12, each of the cross-sectional widths of the slots 222 is preferably less than the diameter of the spherical lower ends 204 of the support rods 200 such that the lower ends 204 of the support rods 200 will not fall through the slots 222. The widths of the slots 222 are also preferably of a dimension such that the spherical lower ends 204 of the support rods 200 will be guided when urged along the length of the slots 222.

Figure 7:
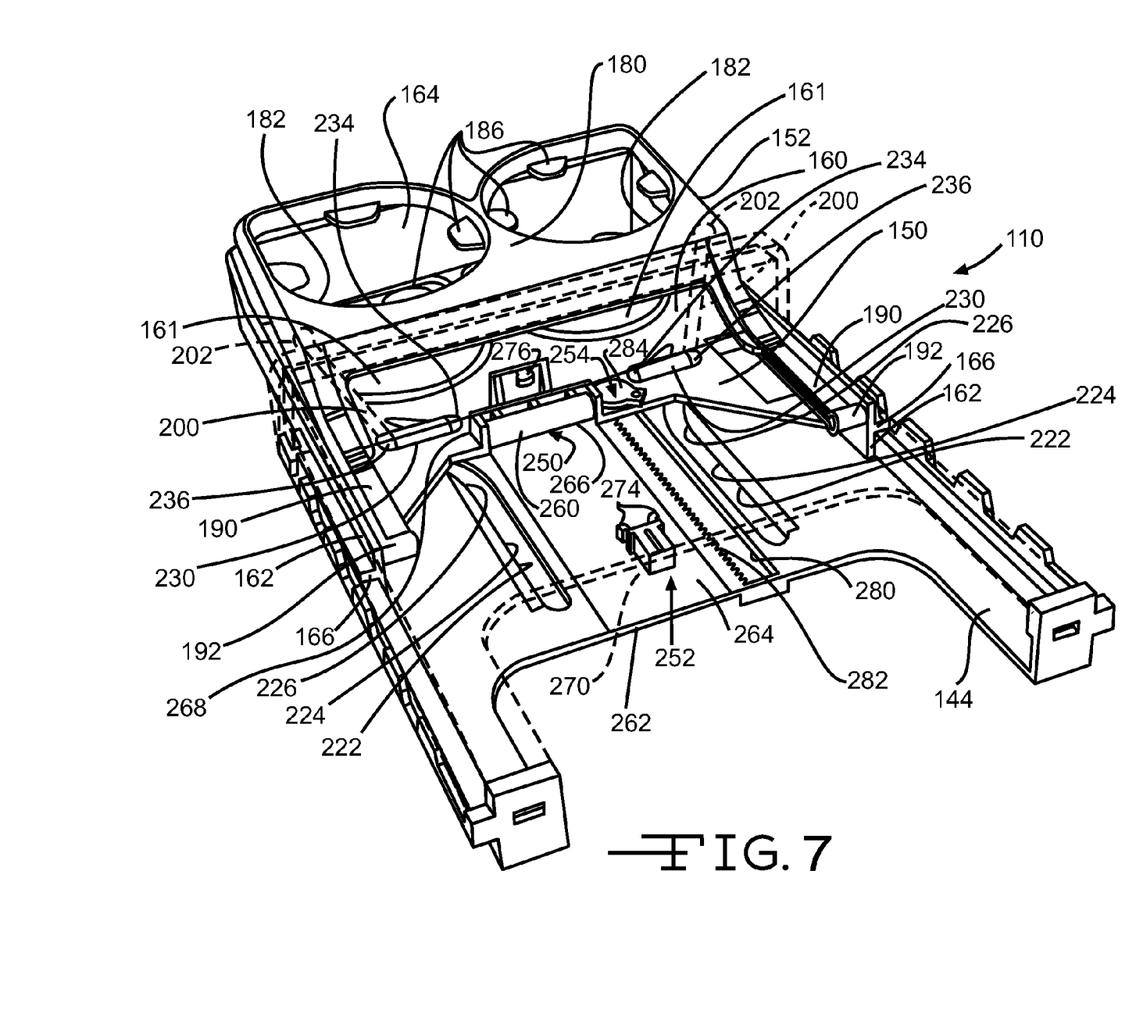
FIG. 7 is a top perspective view of the cupholder assembly of FIG. 2 shown in its extended use position, wherein the upper housing is removed to illustrate various components of the cupholder assembly.

The lower support member 150 further includes a pair of retaining portions 230. Each retaining portion 230 guides and retains a respective lower end 204 of a support rod 200. The retaining portions 230 are in the form of a raised hood or pocket that partially surrounds the respective lower end 204. Each retaining portion 230 includes an opening 232 through which the support rod 200 extends upwardly towards its upper end 202. Each retaining portion 230 also includes an inboard end 234 and an outboard end 236 as shown in FIG. 7. The lower ends 204 of the support rods 200 are supported by the slots 222 of the housing 140 as well as being supported by the retaining portions 230. The retaining portions 230 generally prevent the lower ends 204 of the support rods 200 from moving in an upward direction and a rearward longitudinal direction. As will be explained below, during movement of the cupholder assembly 110 between its retracted and extended positions, the positions of the lower ends 204 of the support rods are determined by their locations within the respective slots 222 and the retaining portions 230.

The cupholder assembly 110 may further include additional features to control the movement of the cupholder assembly 110 between its retracted storage position and its extended use position. In the illustrated embodiment as shown in FIG. 7, the cupholder assembly 110 includes a spring assembly 250, a latch mechanism 252, and a damper assembly 254. The spring assembly 250 can be any suitable spring mechanism that biases the cupholder assembly 110 towards one of the retracted or extended positions of the cupholder assembly 110. In the illustrated embodiment, the spring assembly 250 biases the cupholder assembly 110 in the direction towards the extended use position. The latch mechanism 252 maintains the cupholder assembly 110 in its retracted storage position against the bias of the spring assembly 250. When the latch mechanism 252 is actuated, the latch mechanism 252 releases the cupholder assembly 110 from its retracted storage position and the spring assembly 250 automatically deploys the cupholder assembly 110 to its extended use position. The damper assembly 254 retards or slows the movement of the cupholder assembly 110 during the automatic deployment to its extended use position caused by the force of the spring assembly 250.

As stated above, the spring assembly 250 can be any suitable spring mechanism which biases the cupholder assembly 110 to one of the retracted or extended positions. In the illustrated embodiment as shown in FIG. 7, the spring assembly 250 includes a roll spring 260. The roll spring 260 may be formed from a sheet of metal that is rolled or wound up upon itself when the cupholder assembly 110 is moved towards its retracted position. As shown in FIG. 7, the roll spring 260 includes a free end 262 which is attached to the lower portion 144 of the housing 140. In this state, the roll spring 260 includes a generally planar unrolled portion 264 disposed above the lower portion 144 of the housing 140. The other end of the roll spring 260 is formed in winding or roll portion 266 which is retained in a spring housing 268 formed in the lower support member 150. The spring housing 268 can be any suitable structure which retains the roll portion 266 of the roll spring 260. The roll spring 260 is biased to an open unrolled position. Thus, when the latch mechanism 252 releases the cupholder assembly 110 from its retracted position, the roll spring 260 is free to unroll such that the roll portion 266 acts against the spring housing 268 to move the cupholder assembly 110 to its extended use position.

Referring to FIG. 7, the latch mechanism 252 includes a receiver 270 which is connected to the upper portion 142 of the housing 140. However, since the upper portion 142 of the housing 140 is not shown in FIG. 7 so that various components can be seen more clearly, the receiver 270 is shown in broken lines floating above lower portion 144 of the housing 140 but shown in the correct position as if it was connected to the missing upper portion 142 of the housing 140. The receiver 270 includes a pair of movable jaws 274 which can be moved to a disengaged position, as shown in FIG. 7, and an engaged position with a hook 276 formed on the lower support member 150 located above the spring housing 268. In the engaged position, the jaws 274 engage with the hook 276, thereby preventing movement of the cupholder assembly 110 relative to the housing 140. In the disengaged position, the jaws 274 are spread apart from one another to release them from the hook 276, thereby permitting movement of the cupholder assembly 110 relative to the housing 140. In one possible embodiment, the latch mechanism 222 is a push-push type of mechanism such that the latch mechanism 222 is actuated to both its disengaged and engaged positions by pushing the hook 276 towards the receiver 270. Thus, when the cupholder assembly 110 is in its retracted position, as is shown in FIG. 2, the user simply pushes on the front wall 164 of the lower support member 150 to actuate the push-push latch mechanism 222. When the user pushes against the front wall 164, the jaws 274 are moved from their engaged positions to their disengaged positions. This permits the cupholder assembly 110 to deploy to its extended use position. To return the cupholder assembly 110 to its retracted storage position, the user pushes the cupholder assembly 110 all the way into the opening 156 of the body 108. The user pushes against the biasing force of the roll spring 260 until the hook 276 actuates the receiver 270 to close the jaws 274 and move them to their engaged position with the hook 276.

To prevent the cupholder assembly 110 from moving too rapidly to its extended position due to the force of the roll spring 260, the optional damper assembly 254 is utilized. One suitable damper assembly is a dashpot or a viscous rotary damper which resists motion due to viscous friction. In the illustrated embodiment shown in FIG. 7, the damper assembly 254 includes a linear groove 280 formed in the lower portion 144 of the housing 140 extending in a longitudinal direction. Formed along one wall of the groove 280 is a geared track 282. The damper assembly 254 further includes a gear wheel assembly 284 which is mounted on the lower support member 150 located just above the groove 280. The gear wheel assembly 284 includes a rotatably mounted gear wheel 288, which can be seen in FIG. 5, which engages with the geared track 282. The gear wheel 288 rolls along and engages with the geared track 282 when the cupholder assembly 110 is moved between its retracted storage position and the extended use position. The gear wheel 288 is connected to a viscous damper chamber (not shown) within the damper assembly 254. Rotational movement of the gear wheel 288 is retarded by viscous frictional forces of a fluid being moved or stirred within the damper assembly 254.

The operation and movement of the cupholder assembly 110 between its retracted storage position and the extended use position will now be described. Starting with the cupholder assembly 110 in its retracted storage position, as shown in FIG. 10, the latch mechanism 252 is in its engaged position. As stated above, to move the cupholder assembly 110 the user simply pushes against the front wall 164 to disengage the latch mechanism 252. The spring assembly 250 advances the cupholder assembly 110 in the forward longitudinal direction outwardly from the opening 156 of the body 108. As shown in FIG. 10, the lower ends 204 of the support rods 200 are disposed in the straight portions 224 of the slots 222. Additionally, the lower ends 204 of the support rods 200 are also disposed at the inboard ends 234 of the retaining portions 230.

As the cupholder assembly 110 is advanced, the lower ends 204 of the support rods 200 will be maintained at the inboard ends 234 of the retaining portions 230 during the entire travel of the lower ends 204 of the support rods 200 along the straight portions 224 of the slots 222. Thus, the support rods 200 are generally maintained in their angular positions relative to the cupholder assembly 110 and the upper support member 152 remains in a lowered position adjacent the lower support member 150. In other words, the vertical height of the upper support member 152 relative to the lower support member 150 is not changed during the sliding movement of the lower ends 204 within the straight portions 224 of the slots 222. During further advancement of the cupholder assembly 110 when the lower ends 204 slide along the curved portions 226, the lower ends 204 are also moved laterally towards the outboard ends 236 within the retaining portions 230. This lateral movement causes the support rods 200 to move to a more raised position, thereby lifting the front portion 180 of the upper support member 152 upwardly away from the lower support member 150 as the upper support member 152 pivots about the pivot 192. Thus, the positions of the lower ends 204 of the rods 200 are determined by the crossing of the paths defined by the slots 222 and the retaining portions 230. The support rods 200 will continue to lift the front portion 180 of the upper support member 152 as the lower ends 204 slide along the respective curved portions 226. Further advancement of the cupholder assembly 110 will cause the lower ends 204 of the support rods 200 to be slid into the detent portion 228 of the slots 222. The very end of the detent portion 228 is generally parallel with the straight portions 224 of the slots 222. The edge wall of the detent portion 228 of the slots 222 helps prevent the lower ends 204 from sliding backwards in the slots 222 in the case of a relatively large downward force applied to the upper support member 152. However, a sufficiently strong force may cause the lower ends 204 to slide back towards the curved portions 226.

When the cupholder assembly 110 is in its extended use position, as shown in FIGS. 7 and 11, the support rods 200 are each in an angular position relative to the lateral, longitudinal, and vertical directions. For example, the lower ends 204 of the rods 200 are laterally spaced apart from another by a distance which is less than the lateral distance between the upper ends 202 of the rods 200. The stability of the cupholder assembly 110 is increased as compared to conventional retractable cupholder assemblies having links that are oriented in a non-angular or longitudinal direction. In particular, the angled support rods 200 are able to impede movement of the upper support member 152 when downwardly directed lateral, longitudinal, and/or vertical forces are applied to the upper support member 152.

To move the cupholder assembly 110 back to its retracted storage position, the user simply pushes against the front wall 164 with a sufficient force to overcome the spring bias of the spring assembly 250. The lower ends 204 of the support rods 200 will slide in a rearward longitudinal direction in a reverse order as described above.

It should be understood that the cupholder assembly 110 may be configured such that the mounting connections 208 and 220 are reversed such that the sliding connection 220 is configured for the upper end 202 of the support rods 200. It should also be understood that other mounting connections may be used. For example, the support rods could be configured to change in height when the lower and upper support members are moved between their retracted and extended positions. One suitable configuration would be a telescoping support rod, which may be spring biased, such that each end of the support rod may have a fixed ball and socket attachment to the respective lower and upper support member 150 and 152. This arrangement, however, may require a larger number of individual parts compared to the illustrated embodiment. One advantage of the sliding ball and socket type of connection of the mounting connection 220 is that very few parts are required to accomplish the movement of the upper support member 152 relative to the lower support member 150. Conventionally known cupholder assemblies use a greater number of parts compared to the cupholder assembly 110, thereby reducing part costs and assembly costs. It should also be understood that a single support rod (not shown) may be used instead of a pair of support rods 200 as is shown in the illustrated embodiment. For example, a single support rod may be connected centrally or in a lateral mid-point of the cupholder assembly 110, although such a configuration may not provide as much stability as the pair of support rods 200. Alternatively, more than two support rods may be used, such as for example a pair of support rods connected at each side of the cupholder assembly 110 to provide additional stability to the cupholder assembly 110.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An assembly for supporting an item comprising:
   a housing having an opening;
   a first support member slidably mounted on said housing and movable along a first direction between a retracted position, wherein a distal portion of said first support member is disposed in said opening, and an extended position, wherein said distal portion of said first support member extends outwardly from said opening, wherein said distal portion includes a support surface adapted to support an item;
   a second support member movably mounted on said first support member such that a distal portion of said second support member is movable in a second direction that is normal to said first direction between a first position and a second position that is further spaced from said distal portion of said first support member, wherein said distal portion of said second support member includes a support surface adapted to provide support for the item when said distal portion of said second support member is in said second position; and
   a support rod having a first end connected to said first support member and a second end connected to said second support member, wherein said support rod is angled relative to a third direction which is normal to the first and second directions when said distal portion of said second support member is in said second position.

2. The assembly of claim 1, wherein said support rod defines a first support rod, and wherein said assembly further includes a second support rod having a first end connected to said first support member, and a second end connected to said second support member.

3. The assembly of claim 2, wherein when said first support member is in said extended position, said first ends of said first and second support rods are spaced apart from one another along the third direction by a distance which is greater than the distance said second ends of said first and second support rods are spaced apart from one another along the third direction.

4. The assembly of claim 1, wherein said second end of said support rod is connected to said second support member such that said support rod moves in both the first and third directions when said distal portion of said second support member is moved between said first and second positions.

5. The assembly of claim 4, wherein said second end of said support rod is connected to said second support member by a ball and socket type of configuration.

6. The assembly of claim 1, wherein said first end of said support rod is connected to said first support member such that said support rod moves in both the first and third directions when said distal portion of said second support member is moved between said first and second positions.

7. The assembly of claim 6, wherein said housing includes a slot formed therein, and wherein said first end of said support rod slides in said slot of said housing as said distal portion of said second support member is moved between said first and second positions.

8. The assembly of claim 7, wherein said slot includes a curved portion.

9. The assembly of claim 7, wherein said first support member includes a retaining portion that guides said first end of said support rod along a path relative to said first support member when said second support member is moved between said first and second positions.

10. The assembly of claim 9, wherein said retaining portions extend linearly and parallel to the third direction.

11. The assembly of claim 6, wherein a proximal portion of said second support member is pivotally connected to a proximal portion of said first support member along a pivot axis that is parallel to the third direction.

12. The assembly of claim 1, wherein said assembly is a cupholder assembly and is mounted within a seat armrest, and wherein said housing is disposed in said armrest.

13. The assembly of claim 12, wherein said armrest is pivotally mounted in a recess of a vehicle seat back.

14. The assembly of claim 1, further including a spring assembly which biases said first support member to said extended position from said retracted position.

15. The assembly of claim 14, wherein said spring assembly includes a roll spring.

16. The assembly of claim 14, further including a damper assembly for damping the movement of said first support member to said extended position.

17. The assembly of claim 14, further including a latch mechanism for retaining said first support member in said retracted position within said opening.

18. A seat assembly comprising: a seat back having a recess; and
   an armrest assembly pivotally mounted on said seat back and movable between a storage position within said recess and a use position extending from said recess, said armrest assembly including:
   a housing having an opening;
   a first support member slidably mounted on said housing and movable along a first direction between a retracted position, wherein a distal portion of said first support member is disposed in said opening, and an extended position, wherein said distal portion of said first support member extends outwardly from said opening, wherein said distal portion includes a support surface adapted to support an item;

a second support member pivotally mounted on said first support member such that a distal portion of said second support member is movable in a second direction that is normal to said first direction between a first position and a second position that is spaced further from said distal portion of said first support member, wherein said distal portion of said second support member includes a support surface adapted to provide support for the item when said distal portion of said second support member is in said second position; and a first support rod having a first end connected to said first support member and a second end connected to said second support member;

a second support rod having a first end connected to said first support member and a second end connected to said second support member;

wherein said first and second support rods are angled relative to a third direction which is normal to the first direction when said distal portion of said second support member is in said second position, and wherein said second ends of said first and second support rods are connected to said second support member such that said first and second support rods move in both the first and third directions when said distal portion of said second support member is moved between said first and second positions.

19. The seat assembly of claim 18, wherein said housing includes first and second curved slots formed therein, and wherein said first end of said first support rod slides in said first slot as said distal portion of said second support member is moved between said first and second positions, and wherein said first end of said second support rod slides in said second slot as said distal portion of said second support member is moved between said first and second positions.

20. An assembly for supporting an item comprising:

a housing including an opening;

a first support member having a surface that is adapted to support an item, the first support member being supported on the housing for sliding movement in a first direction between a retracted position, wherein the surface of the first support member is disposed within the housing, and an extended position, wherein the surface of the first support member extends through the opening outwardly from the housing;

a second support member having a surface that is adapted to support an item, the second support member being supported on the first support member for pivoting movement in a second direction that is normal to the first direction, wherein the surface of the second support member is pivoted away from the surface of the first support member when the first support member is moved from the retracted position to the extended position; and a support rod including a first end that is pivotably connected to the first support member and a second end that is pivotably connected to the second support member such that when the first support member is moved from the retracted position to the extended position, the second end of the support rod is moved in a third direction that is normal to both the first direction and the second direction.

* * * * *